United States Patent
Kennedy et al.

(10) Patent No.: US 8,364,691 B2
(45) Date of Patent: Jan. 29, 2013

(54) DYNAMIC QUERY-BASED DEBUG POINT MAPPER

(75) Inventors: Sean P. Kennedy, Ontario (CA); Peter A. Nicholls, Ontario (CA); David A. Salinas, Ontario (CA); Jonathan E. P. Tzanakakis, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 13/071,657

(22) Filed: Mar. 25, 2011

(65) Prior Publication Data

US 2012/0246186 A1 Sep. 27, 2012

(51) Int. Cl.
*G06F 7/00* (2006.01)
(52) U.S. Cl. ........ 707/758; 707/695; 717/100; 717/124; 717/128; 717/129
(58) Field of Classification Search .......... 707/758, 707/695; 717/100, 124, 128, 129
See application file for complete search history.

(56) References Cited

U.S. PATENT DOCUMENTS

| | | | |
|---|---|---|---|
| 5,940,593 A * | 8/1999 | House et al. ............... 709/203 |
| 6,353,923 B1 * | 3/2002 | Bogle et al. ............... 717/128 |
| 2003/0005415 A1 | 1/2003 | Bates et al. | |
| 2003/0221187 A1 * | 11/2003 | Barsness et al. ........... 717/129 |
| 2004/0168155 A1 * | 8/2004 | O'Farrell et al. .......... 717/129 |
| 2004/0225920 A1 | 11/2004 | Bates et al. | |
| 2007/0168736 A1 | 7/2007 | Ottavi et al. | |
| 2007/0168979 A1 * | 7/2007 | Kumar et al. ............... 717/124 |
| 2008/0046866 A1 | 2/2008 | Bates et al. | |
| 2008/0134149 A1 | 6/2008 | Bates et al. | |
| 2008/0141118 A1 * | 6/2008 | Arkhipov et al. ........... 715/241 |
| 2009/0125890 A1 | 5/2009 | Bennet et al. | |
| 2010/0017788 A1 * | 1/2010 | Bronkhorst et al. ......... 717/125 |

OTHER PUBLICATIONS

ScottGu's Blog, [online]; [retrieved on Mar. 25, 2011]; retrieved from the Internet http://weblogs.asp.net/scottgu/archive/2010/04/21/vs-2010-debugger-improvements-breakpoints-datatips-import-export.aspx Scott Guthrie, "VS 2010 Debugger Improvements (BreakPoints, DataTips, Import/Export)," Apr. 21, 2010.

* cited by examiner

*Primary Examiner* — Cheyne Ly
(74) *Attorney, Agent, or Firm* — Cantor Colburn LLP; Jeff Tang

(57) ABSTRACT

A method of creating and maintaining debug points in an integrated development environment (IDE) includes receiving a first query at a computing device coupled to the IDE, the first query identifying one or more actions; searching the source code with the computing device to locate locations where the one or more actions occur; forming an initial result set that includes locations of the one or more actions; receiving a desired behavior action for some or all of the locations; associating the initial result set and the desired behavior actions to form a first mapping; and storing the mapping and the first query as a first dynamic query based debug point map.

9 Claims, 4 Drawing Sheets

DYNAMIC QUERY-BASED DEBUG POINT MAPPER

BACKGROUND

The present invention relates to debugging computer programs and, more specifically, to generating and maintaining breakpoints for use in the debugging process.

As the size of and complexity of software applications has increased, it has become more and more common for large groups of individuals (developers) to split the development of these applications into pieces amongst themselves. An integrated development environment (IDE) is a software application that provides comprehensive facilities to these individuals and allows for all of them to work together during the development process. A typical IDE can include a source code editor, a compiler and/or an interpreter, a builder, and a debugger.

As developers become accustomed to debugging in such environments, the developers are relying more and more on the IDE's source visualization and search features to understand their program while debugging. For example, developers commonly use a Call Hierarchy view to locate all callers of a function, or use a search view to perform a language-aware search to find all modifications of a variable. Once the developer has the results of any particular search, the developer can manually define a debug point for some or all of the results. A debug point defines an action to be taken for an asynchronous debug event. Examples of actions include suspending execution, logging data, running a script, etc. Examples of asynchronous debug events are: execution reaching a desired line of code, program changing an area of memory, the program loading a new module. An example of a debug point is a breakpoint, which suspends execution when a debug event occurs.

SUMMARY

According to one embodiment, a method of creating and maintaining debug points in an integrated development environment (IDE) is disclosed. The method of this embodiment includes: receiving a first query at a computing device coupled to the IDE, the first query identifying one or more actions; searching the source code with the computing device to locate locations where the one or more actions occur; forming an initial result set that includes locations of the one or more actions; receiving a desired behavior action for some or all of the locations; associating the initial result set and the desired behavior actions to form a first mapping; and storing the mapping and the first query as a first dynamic query based debug point map.

According to another embodiment, a method of creating and maintaining debug points in an integrated development environment (IDE) is disclosed. The method of this embodiment includes: receiving a first query at a computing device coupled to the IDE, the first query identifying one or more actions in the source code; searching the source code with the computing device to locate locations where the one or more actions identified by the first query occur; forming an initial result set that includes the locations; receiving a second query identifying one or more actions in the source code; searching the source code to locate locations where the one or more actions identified in the second query occur; forming a secondary result set that includes locations where the one or more actions identified in the second query occur; combining the initial result set and the secondary result set to form a hybrid result set; receiving a desired behavior action for some or all of the locations in the hybrid result set; associating the hybrid result set and the desired behavior actions to form a first mapping; and storing the first mapping and the hybrid result set as a dynamic query based debug point map.

According to another embodiment, a system for creating and maintaining debug points in an integrated development environment (IDE) is disclosed. The system of this embodiment includes a query builder configured to receive a first query identifying one or more actions of interest in the source code in the IDE and provide the first query to a query engine and a debug point mapper configured to receive a first result set from the query engine, the first result set including locations in the source code where the one or more actions of interest occur and to associate some or all of the instances with a desired behavior to form a mapping result that, in combination with the first query, form a dynamic query based debug point map. The system of this embodiment also includes a monitor configured to cause the query engine to query the source code with the first query after determining that the source code has changed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

While the prior art does allow for the creation of debug points for specific entries in a search result, it has one or more drawbacks. For example, a developer (or other user) can create a search and receive a list of locations in the source code that satisfy the criteria of the search. The developer must then manually create debug points for some or all of the locations on the list individually. Furthermore, after the debug point is created, the developer has to manage them individually. In addition, as the source code (e.g., software code being debugged) changes, there is currently no easy way to know whether the debug points are valid, with respect to the semantic meaning of the original search query, any longer.

Figure 1:
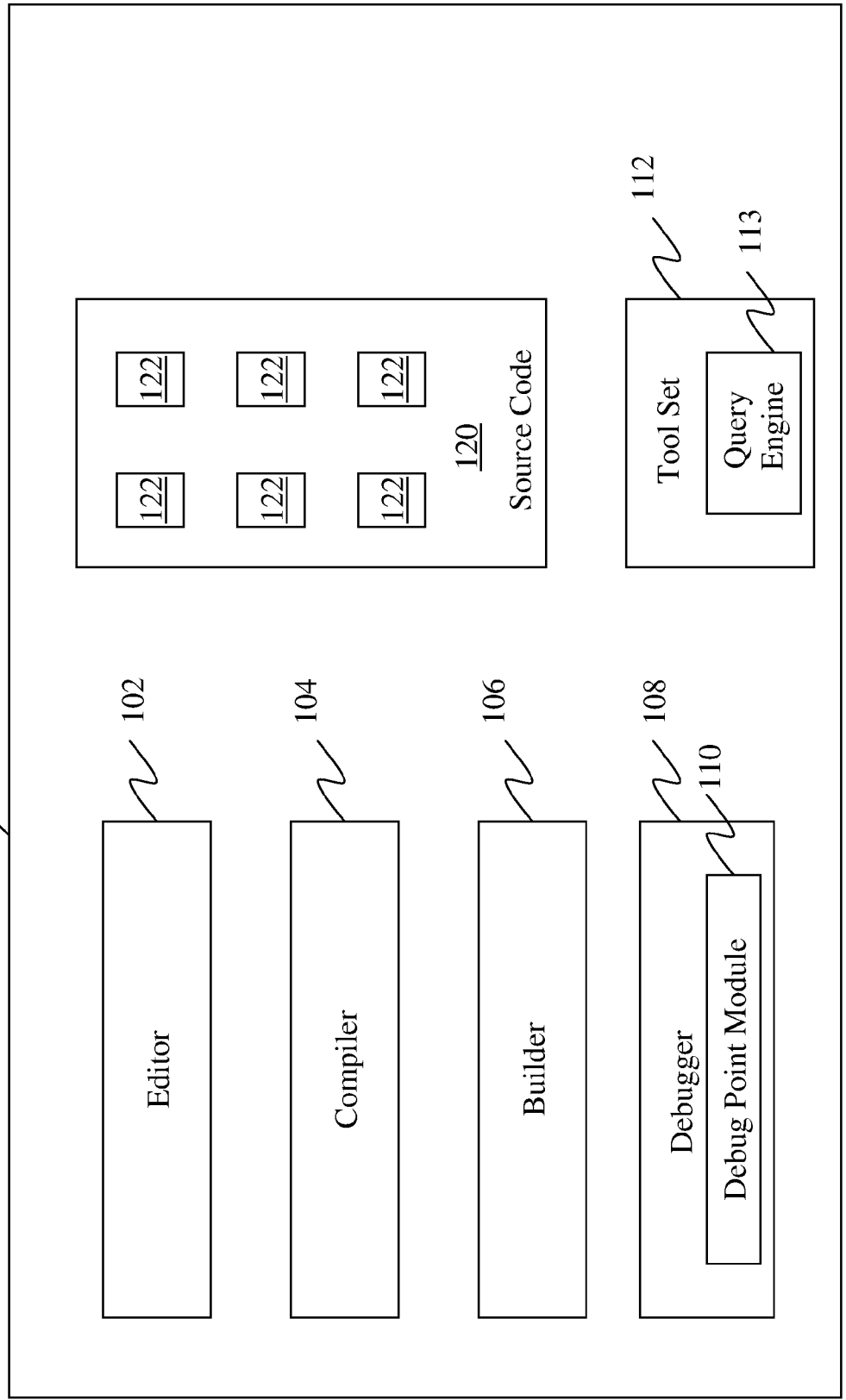
FIG. 1 illustrates an integrated design environment in which embodiments of the present invention can be implemented.

With reference now to FIG. 1, an IDE 100 is illustrated. The IDE 100 includes an editor 102, a compiler 104, a builder 106 and a debugger 108. The IDE 100 can be used to develop source code 120 that includes one or more sub-programs 122. The editor 102, compiler, 104, and builder 106 can be the same as or similar to standard editors, compilers or builders either now known or later developed. Furthermore, except as otherwise noted herein, the debugger 108 can also be the same as or similar to prior art or later developed debuggers.

The IDE 100 also includes a tool set 112 that can be used to access or otherwise manipulate the source code 120. In some cases, the tool set 112 can perform various searches of the source code 120. The tool set 112, as such, includes a query engine 113. In one embodiment, the query engine 113 is a standard part of the IDE 100. The searching capabilities of the query engine 113 can include, but are not limited to, language aware searches and call hierarchy searches. A language aware search can be used, for example, to find locations in the source code 120 where a particular variable is modified or otherwise processed (e.g., passed) during execution of the source code 120. A call hierarchy search locates, for example, all functions or other methods that call a particular function or method. As discussed above, after the results of a particular search is returned, in the prior art, a developer had to include separate debug events or watch instructions for each returned location the developer was interested in.

In one embodiment, the debugger 108 includes a debug point module 110. The debug point module 110, generally, allows a developer to specify a query and then transform the results of the query into a dynamic query-based debug point map. The query, the current result set, and the action to be taken at each of the entries in the current result set are stored as properties of the dynamic query-based debug point map in one embodiment. It shall be appreciated, however, the not all of the query, the current result set and the action need to be included in the dynamic query-based debug point map. For example, in one embodiment, only the query and information from which the actions to be taken at each location can be derived (e.g., the debug mapper described below) need to be stored as properties of the dynamic query-based debug point map. The actions can include, but are not limited to, creating logs or other outputs when certain actions occur or locations are reached or causing the program to suspend when certain locations are reached. Of course, any other known or later developed debugging actions could be included in the list of desired behaviors as will be readily realized by one of skill in the art. In one embodiment, and as illustrated in FIG. 1, the debug point module 110 is part of the debugger 108. In such a case, the debugger 108 includes further capabilities than those of the prior art. Of course, the debug point module 110 could be separate from the debugger 108. In such a case, the debugger 108 can operate as in the prior art. Of course, in such an embodiment, the debugger 108 can be configured to receive a debut point and cause the desired behavior actions to occur when the particular locations are reached during execution.

The IDE 100 illustrated in FIG. 1 can be generally operated as follows. The developer(s) utilizes the editor 102 to create or modify the source code 120 or one or more of the sub-programs 122. At a certain point in the development of the source code 120, the developer can utilize the builder 106 and compiler 104 to create executable runtime code from the source code 120 that can be executed by a runtime engine (not shown). The debugger 108, in combination with a runtime engine tracks position in the source code 120 corresponding to the location being processed by the runtime engine, and can affect the defined actions associated with debug events.

Figure 2:
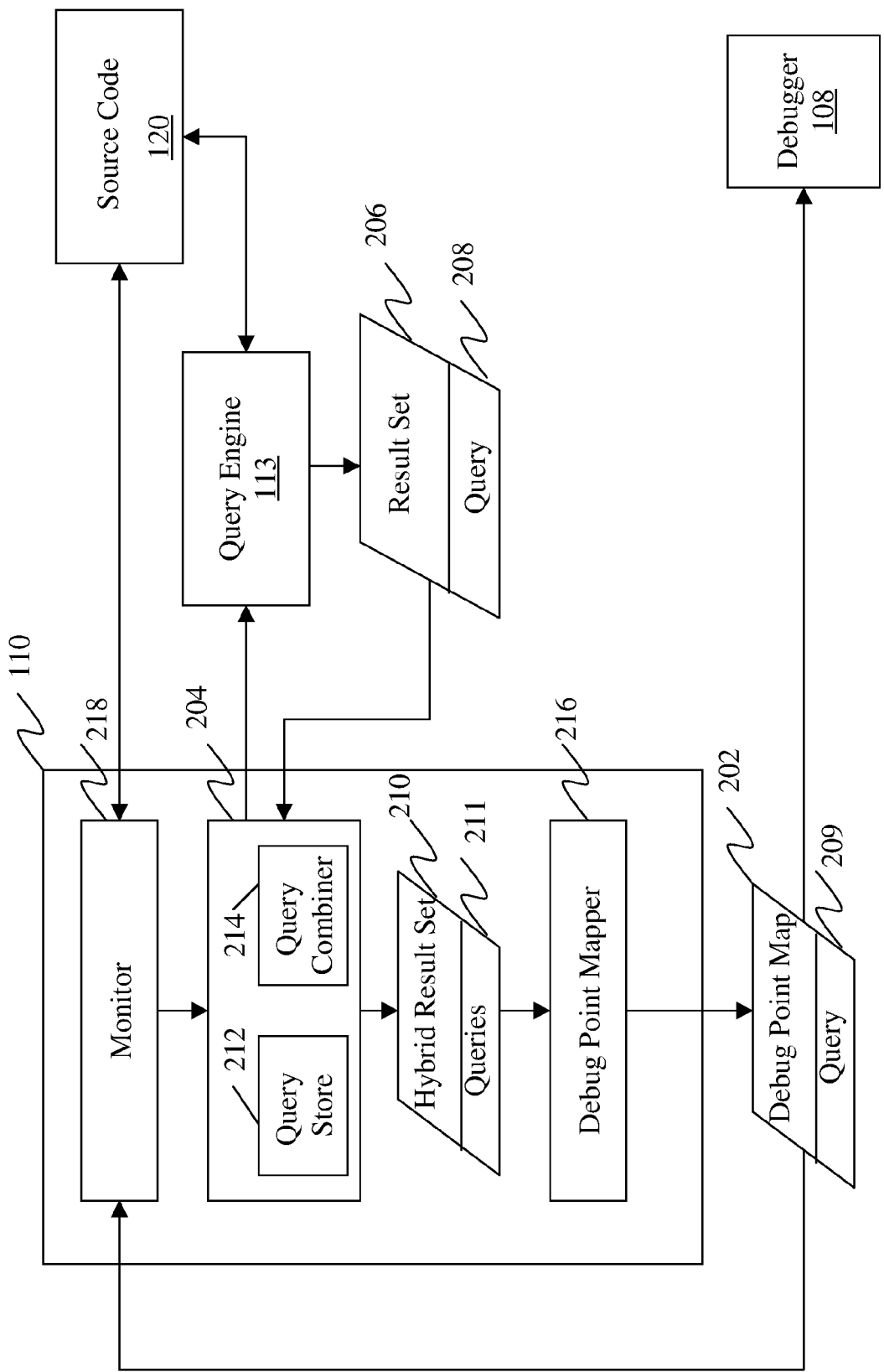
FIG. 2 is a data flow diagram showing a system and the method it performs while creating a breakpoint according to an embodiment of the present invention.

FIG. 2 illustrates a data flow diagram showing the creation of a dynamic query based debug point map 202. A breakpoint module 110 is utilized to create the dynamic query based breakpoint 202. The breakpoint module 110, as described above, can be part of the debugger 108 (FIG. 1) or a standalone unit.

The debug point module 110 includes a query builder 204. The query builder 204 can be used to create queries provided to the query engine 113. The query engine 113 searches the source code 120 to find locations in it that satisfy the query. The locations are provided in a result set 206. The result set 206 can include, in one embodiment, a query description 208 that caused the retrieval of a particular result set 206.

In one embodiment, the result set 206 is provided to the query builder 204 (or other viewing mechanism) for the developer to examine the results. In some cases, the result set 206 can be too large and may need to be pruned or otherwise made more manageable. One way to achieve such pruning is to combine the result set 206 with a different result set to form a hybrid result set 210 that can include, for example, results that appear in both result sets. To that end, in embodiment, the query builder 204 can include a query store 212 that stores result sets and the queries that generated the results and a query combiner 214 that combines queries. Of course, if the result set 206 is satisfactory to the developer, the result set 206 and the hybrid result set 210 can be same. In one embodiment, the hybrid result set also includes a hybrid query description 211 of the one or more queries used to form the hybrid result set 210. Again, if no queries were combined, the hybrid query description 211 can be the same as the query description 208.

Examples of queries that can be created by the query builder 204 can include, but are not limited to, searches for: source code lines changed by a change set; source code lines were a variable's value is changed; source code lines where basic code blocks begin. Of course, the type of query is only limited by the capabilities of the query engine 113.

Regardless of how formed, the hybrid result set 210 is provided to a breakpoint mapper 210. The breakpoint mapper 210 provides a location where, in one embodiment, a particular type of behavior action can be applied to each instance in the hybrid result set 206. For example, if the query was for all changes in a change set, a trace-point could be specified to indicate when program execution passed a particular location. In one embodiment, a developer may be provided with the ability to override the general behavior action with a specific behavior action for a particular instance.

Figure 3:
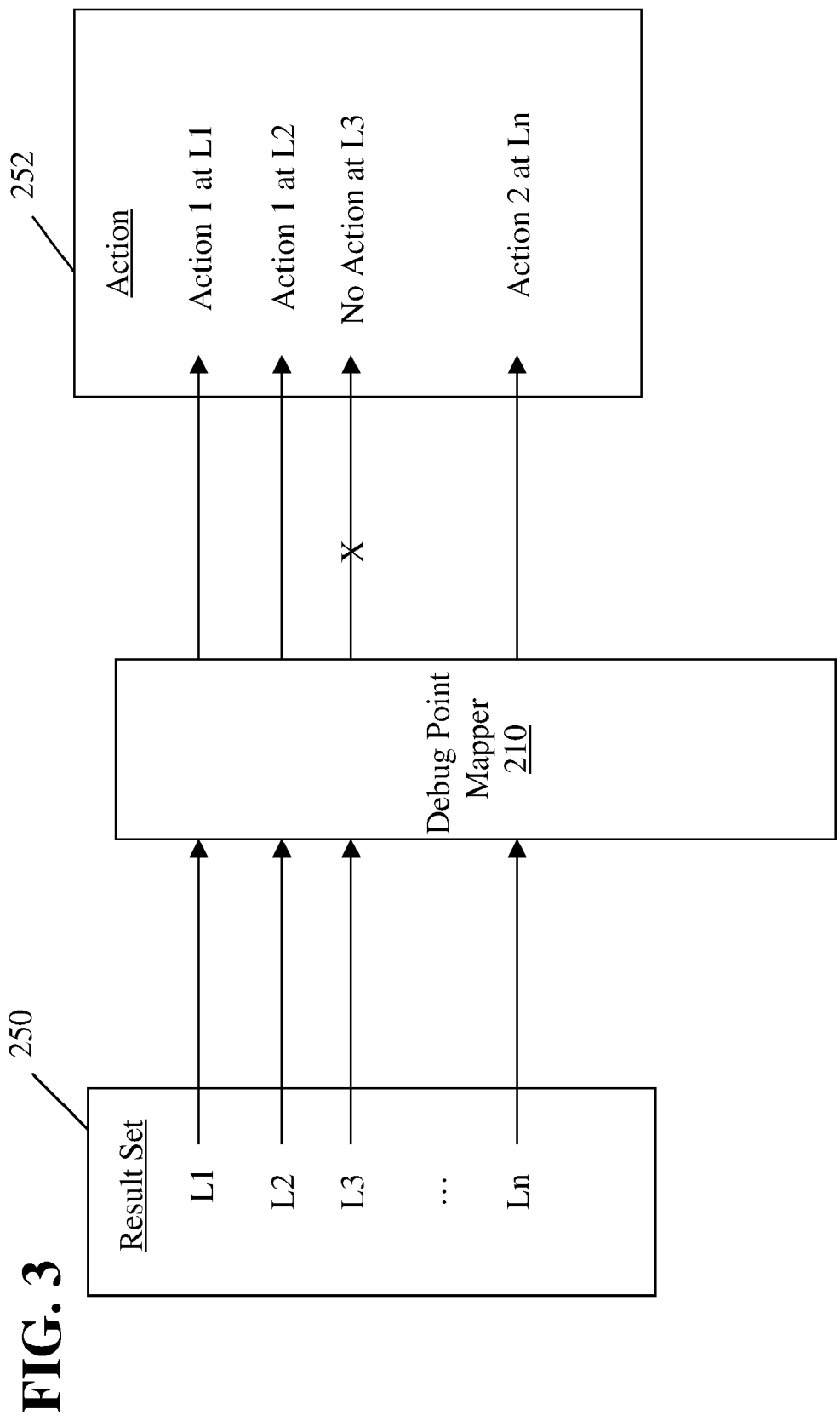
FIG. 3 illustrates how the mapping is applied to the result set to define the actions to be taken at each of its entries.

Regardless, the affects of the dynamic query-based debug map 202 at each entry in the result set is defined by the debug point mapper 210. Reference is now made to FIG. 3 where an example of the effects of debug point mapper 210 are illustrated. The debug point mapper 210 receives the current result set 250. The current result set 250 can be a combination of one or more result sets (e.g., a hybrid result set) in one embodiment. As illustrated, the current result set 250 includes a listing of locations (L1, L2 . . . Ln) in the source code that satisfied the query (or queries) formed by the user. The debug point mapper 210 includes a set of rules that causes it to create an action to be performed at each of the locations (L1-Ln) in the result set 250. The set of rules can cause the same action to be performed at one or more of the locations, different actions to be performed at some or all of the locations, or any combination thereof.

As illustrated, the actions to be taken are contained as a mapping result 252. In one embodiment the mapping result 252 includes an action to be performed at each location (L1-Ln) in the result set. In the illustrated example, the mapping result 252 causes the same action (Action 1) to be performed at both L1 and L2, no action to be performed at L3 and for Action 2 to be performed at L3.

Referring again to FIG. 2, the debug point module 110 produces a dynamic query based debug point map 202 that includes, in one embodiment, the (hybrid) query, the current result set generated by the (hybrid) query, and the mapping to be applied to the result set to define the action to take a each location. As described above, the actual contents of the dynamic query based debug point map 202 can vary. When a debug session begins, the actual actions that will apply in it are created by applying the mapping to the current result set. The dynamic query based debug point map 202 202 can be stored, in one embodiment, as a separate document that can be accessed, for example, by debugger 108 or other element in IDE 100.

In one embodiment, the dynamic query based debug point map 202 is provided to debugger 108. The debugger 108 then causes the behavior action (normal or special) to happen at locations in the dynamic query based debug point map 202. For example, if the dynamic query based debug point map 202 includes locations where a variable is changed, a line break could be inserted that causes execution to stop at the location of the instances.

Figure 4:
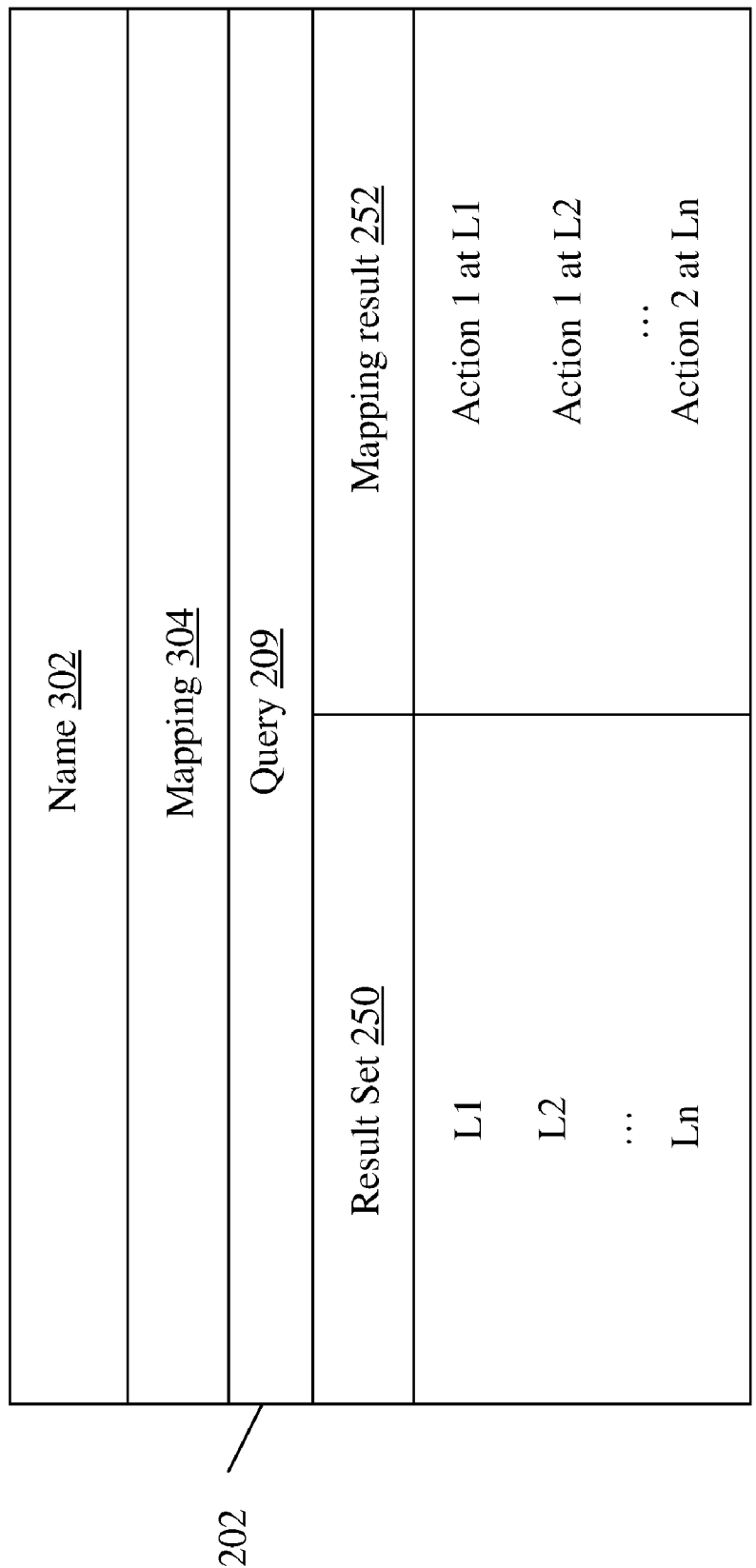
FIG. 4 is a conceptual representation of a breakpoint according to an embodiment of the present invention.

FIG. 4 shows a conceptual view of a dynamic query based debug point map 202. The dynamic query based debug point map 202 can include a semantic name 302. The name can be descriptive of the dynamic query based debug point map 202 and can be assigned, for example, based on information received from the developer. For example, assume that the query 209 that generated the result set requested the line location of entry to all compiler-generated basic blocks. In such a case, the name 302 could be, for example, code block entry breakpoint.

The dynamic query based debug point map 202 can also include a mapping 304. In one embodiment, unless otherwise specified, the mapping 304 can be, for example, the set of rules that created the mapping result 252 of FIG. 3. To that end, in one embodiment, the query based breakpoint 202 can also include, the query 209 that generated the result set 250 and the mapping result 252.

Referring again to FIG. 2, in one embodiment the debug point module 110 also includes a monitor 218. The monitor 218 monitors the source code 120 and determines if it changes. The changes can come, for example, from a developer adding new or modifying existing sub-programs. Such modification can include, without limitation, when a file or line is either added or deleted. The monitor 218 can also monitor when a new build of the source code 120 occurs. In one embodiment, after determining that a change or build has occurred, the monitor 218 can provide the one or more queries 209 that created the existing dynamic query based debug point map 202 to query builder 204 in order to create a new breakpoint in the same manner as described above.

In view of the above, it shall be appreciated that embodiments of the present invention can have the technical effect of creating breakpoints that occur while debugging across different iterations of source code during its development without requiring a developer to recreate the breakpoints.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of creating and maintaining debug points in an integrated development environment ODE), the method executed by a processor comprising:
   receiving a first query at a computing device coupled to the IDE, the first query identifying one or more actions;
   searching the source code with the computing device to locate locations where the one or more actions occur;
   forming an initial result set that includes locations of the one or more actions;
   receiving a desired behavior action for some or all of the locations;
   associating the initial result set and the desired behavior actions to form a first mapping;
   storing the mapping and the first query as a first dynamic query based debug point map;
   monitoring a state of the source code;
   determining that the state of the source code has changed to form changed source code;
   searching the changed source code with the computing device to locate locations where the one or more actions occur based on the first query;
   forming a second result set that includes locations of the one or more actions in the changed source code;
   associating the second result set and the desired behavior actions to form a modified mapping; and
   storing the modified mapping and the first query as the dynamic query based debug point map.

2. The method of claim 1, wherein associating the second result set is performed automatically.

3. The method of claim 1, wherein associating the second result set is performed based on a user input.

4. The method of claim 1, wherein associating is performed automatically.

5. The method of claim 1, wherein the behavior actions are selected from: address, entry, exit, line, load, trace, and watch.

6. The method of claim 1, wherein the behavior actions are performed when the locations they are associated with are reached during an execution of the source code.

7. The method of claim 1, further comprising:
   providing the dynamic query based debug point map to a debugger; and
   performing the behavior actions at the locations.

8. The method of claim 1, wherein the actions include calling a function or modifying a variable.

9. A system for creating and maintaining debug points in an integrated development environment (IDE), the system comprising:
   a processor;
   a query builder configured to receive a first query identifying one or more actions of interest in the source code in the IDE and provide the first query to a query engine;
   a debug point mapper configured to receive a first result set from the query engine, the first result set including locations in the source code where the one or more actions of interest occur and to associate some or all of the instances with a desired behavior to form a mapping result that, in combination with the first query, form a dynamic query based debug point map;
   a monitor configured to cause the query engine to query the source code with the first query after determining that the source code has changed;
   search the changed source code to locate locations where the one or more actions occur based on the first query;
   form a second result set that includes locations of the one or more actions in the changed source code;
   associating the second result set and the desired behavior actions to form a modified mapping; and
   storing the modified mapping and the first query as the dynamic query based debug point map.

* * * * *